United States Patent
Natarajan et al.

(10) Patent No.: US 10,999,813 B2
(45) Date of Patent: May 4, 2021

(54) METHOD FOR USER EQUIPMENT'S REGISTRATION UPDATE

(71) Applicant: NOKIA TECHNOLOGIES OY, Espoo (FI)

(72) Inventors: Rajesh Babu Natarajan, Bangalore (IN); Hannu Hietalahti, Kiviniemi (FI); Senthilnathan Neelamegam, Madurai Tamil Nadu (IN); Raju Kondaparthy, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/003,226

(22) Filed: Aug. 26, 2020

(65) Prior Publication Data

US 2021/0068067 A1 Mar. 4, 2021

(30) Foreign Application Priority Data

Aug. 29, 2019 (FI) .................................. 20195713

(51) Int. Cl.
*H04W 60/04* (2009.01)
*H04W 60/02* (2009.01)
(Continued)

(52) U.S. Cl.
CPC ........... *H04W 60/04* (2013.01); *H04W 60/02* (2013.01); *H04W 8/02* (2013.01); *H04W 88/06* (2013.01)

(58) Field of Classification Search
CPC ..... H04W 60/04; H04W 60/02; H04W 88/06; H04W 8/02
See application file for complete search history.

(56) References Cited

U.S. PATENT DOCUMENTS 7,386,312 B2 * 6/2008 Kanto ..................... H04W 8/02
455/432.1
7,398,087 B1 * 7/2008 McConnell ........... H04W 84/02
455/414.1
(Continued)

FOREIGN PATENT DOCUMENTS

WO  WO 2013/028559 A1  2/2013
WO  WO 2019/031874 A1  2/2019
(Continued)

OTHER PUBLICATIONS

Finnish Search Report dated Nov. 26, 2019 corresponding to Finnish Patent Application No. 20195713.
(Continued)

*Primary Examiner* — Julio R Perez
(74) *Attorney, Agent, or Firm* — Squire Patton Boggs (US) LLP

(57) ABSTRACT

The present subject matter relates to a method comprising performing, by a user equipment, a first registration at a registration node via a first network access; performing, by the user equipment, a second registration at the registration node via a second network access. In response to determining that the user equipment is not connected to the registration node via the first network access, an update of the first registration with the registration node may be triggered, by the user equipment, dependent upon the user equipment being connected to the registration node via the second network access.

16 Claims, 6 Drawing Sheets

(51) Int. Cl.
*H04W 8/02* (2009.01)
*H04W 88/06* (2009.01)

(56) References Cited

U.S. PATENT DOCUMENTS

| | | | |
|---|---|---|---|
| 8,649,786 B2 * | 2/2014 | Casati | H04W 60/04 |
| | | | 455/432.1 |
| 10,136,370 B1 * | 11/2018 | Oroskar | H04W 36/0061 |
| 10,797,894 B2 * | 10/2020 | Qiao | H04L 12/1407 |
| 10,805,402 B1 * | 10/2020 | Whitman | G06Q 10/0833 |
| 10,819,636 B1 * | 10/2020 | Goel | H04L 12/2858 |
| 2006/0111105 A1 * | 5/2006 | Bajar | H04W 12/06 |
| | | | 455/435.1 |
| 2007/0140170 A1 * | 6/2007 | Jagana | H04W 8/12 |
| | | | 370/331 |
| 2014/0323128 A1 * | 10/2014 | Zaus | H04L 1/1812 |
| | | | 455/435.2 |
| 2017/0150471 A1 * | 5/2017 | Li | H04W 48/18 |
| 2018/0020418 A1 * | 1/2018 | Chandramouli | H04W 16/14 |
| 2019/0037516 A1 * | 1/2019 | Kim | H04W 60/00 |
| 2019/0059067 A1 | 2/2019 | Lee et al. | |
| 2019/0116486 A1 * | 4/2019 | Kim | H04W 8/10 |

FOREIGN PATENT DOCUMENTS

| | | |
|---|---|---|
| WO | WO 2019/041897 A1 | 3/2019 |
| WO | WO 2019/144768 A1 | 8/2019 |

OTHER PUBLICATIONS

Office Action dated Nov. 26, 2019 corresponding to Finnish Patent Application No. 20195713.
Communication of Acceptance under section 29a of Patents Decree dated Apr. 21, 2020 corresponding to Finnish Patent Application No. 20195713.
Extended European Search Report dated Dec. 22, 2020 corresponding to European Patent Application No. 20192292.9.

* cited by examiner

METHOD FOR USER EQUIPMENT'S REGISTRATION UPDATE

FIELD OF THE INVENTION

Various example embodiments relate to computer networking, and more particularly to a method for user equipment's registration update.

BACKGROUND

The 5th generation wireless networks (5G) refer to a new generation of radio systems and network architecture. 5G is expected to provide higher bitrates and coverage than the current long term evolution (LTE) systems. 5G is also expected to increase network expandability up to hundreds of thousands of connections. The signal technology of 5G is anticipated to be improved for greater coverage as well as spectral and signaling efficiency. 5G is expected to deliver extreme broadband and ultra-robust, low latency connectivity and massive networking to support different network access technologies However, with different network access technologies becoming more widespread, there will be a growing need for networks that meet the needs of efficient use of the network access technologies.

SUMMARY

Example embodiments provide an apparatus comprising means configured for performing: a first registration with a registration node via a first network access, a second registration with the registration node via a second network access, a determination that the apparatus is not connected to the registration node via the first network access, in response to the determination and dependent upon a connection status of the apparatus to the registration node via the second network access, triggering of an update of the first registration via the second network access.

According to further example embodiments, a method comprises: performing by a user equipment a first registration with a registration node via a first network access, performing by the user equipment a second registration with the registration node via a second network access, determining that the user equipment is not connected to the registration node via the first network access, in response to the determination and dependent upon a connection status of the user equipment to the registration node via the second network access, triggering of an update of the first registration via the second network access.

According to further example embodiments, a computer program comprises instructions stored thereon for performing at least the following: performing a first registration of a user equipment with a registration node via a first network access, performing a second registration of the user equipment with the registration node via a second network access, determining that the user equipment is not connected to the registration node via the first network access, in response to the determination and dependent upon a connection status of the user equipment to the registration node via the second network access, triggering of an update of the first registration via the second network access.

According to further example embodiments, a method comprises: performing, by a registration node, a first registration of a user equipment via a first network access, upon receiving a first registration request from the user equipment, performing, by the registration node, a second registration of the user equipment via a second network access, upon receiving a second registration request from the user equipment, updating, by the registration node, the first registration dependent upon a connection status of the user equipment via the second network access.

According to further example embodiments, a computer program comprises instructions stored thereon for performing at least the following: performing a first registration of a user equipment via a first network access, upon receiving a first registration request from the user equipment, performing a second registration of the user equipment via a second network access, upon receiving a second registration request from the user equipment, updating the first registration dependent upon a connection status of the user equipment via the second network access.

According to further example embodiments, an apparatus comprises means configured for performing: a first registration of a user equipment via a first network access, upon receiving a first registration request from the user equipment, a second registration of the user equipment via a second network access, upon receiving a second registration request from the user equipment, updating the first registration dependent upon a connection status of the user equipment via the second network access.

The network access may mean a network access technology. The network access technology may mean a network access.

BRIEF DESCRIPTION OF THE DRAWINGS

The accompanying figures are included to provide a further understanding of examples, and are incorporated in and constitute part of this specification. In the figures.

DETAILED DESCRIPTION

Figure 1:
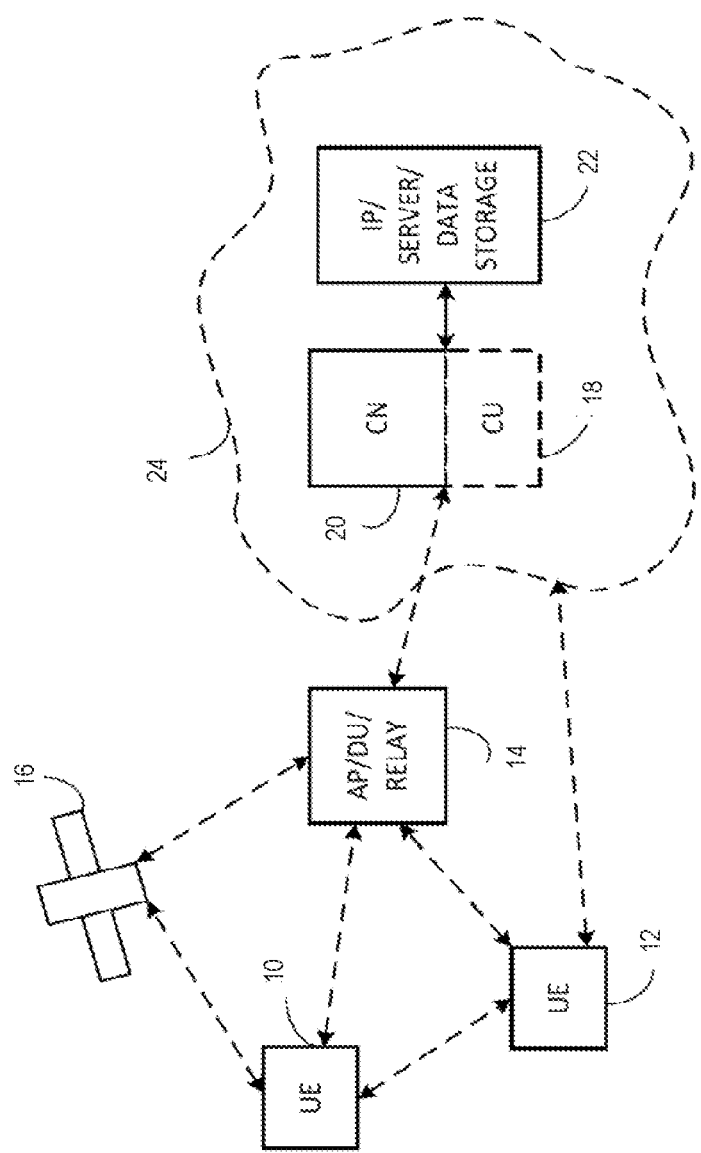
FIG. 1 illustrates a part of an exemplifying radio access network.

In the following description, for purposes of explanation and not limitation, specific details are set forth such as particular architectures, interfaces, techniques, etc., in order to provide a thorough understanding of the examples. However, it will be apparent to those skilled in the art that the disclosed subject matter may be practiced in other illustrative examples that depart from these specific details. In some instances, detailed descriptions of well-known devices and/or methods are omitted so as not to obscure the description with unnecessary detail.

An example provides an apparatus comprising means configured for performing: a first registration with a registration node via a first network access, a second registration with the registration node via a second network access, in response to determining that the apparatus is not connected to the registration node via the first network access, triggering, depending on a connection status of the apparatus, an update, via the second network access, of the first registration, the connection status being a state of a connection of the apparatus with the registration node via the second network access.

An example provides a method comprising: performing, by a user equipment a first registration with a registration node through a first network access, performing, by the user equipment, a second registration with the registration node through a second network access, in response to determining that the user equipment is not connected to the registration node through the first network access, triggering, by the user equipment, an update of the first registration with the registration node depending on a connection status of the user equipment, the connection status being a state of a connection, through the second network access, with the registration node.

According to a further example, a computer program comprises instructions stored thereon for performing at least the following: performing a first registration of a user equipment with a registration node through a first network access, performing a second registration of the user equipment with the registration node through a second network access, in response to determining that the user equipment is not connected to the registration node through the first network access, triggering an update of the first registration with the registration node depending on a connection status of the user equipment, the connection status being a state of a connection, through the second network access, with the registration node.

According to a further example, an apparatus comprises means configured for performing: a first registration with a registration node through a first network access, a second registration with the registration node through a second network access, in response to determining that the apparatus is not connected to the registration node through the first network access, triggering an update of the first registration with the registration node depending on a connection status of the apparatus, the connection status being a state of a connection, through the second network access, with the registration node.

According to a further example, a method comprises: performing, by a registration node, a first registration of a user equipment through a first network access upon receiving a first registration request from the user equipment, performing, by the registration node, a second registration of the user equipment through a second network access upon receiving a second registration request from the user equipment, updating, by the registration node, the first registration depending on a connection status of the user equipment through the second network access.

According to a further example, a computer program comprises instructions stored thereon for performing at least the following: performing a first registration of a user equipment through a first network access upon receiving a first registration request from the user equipment, performing a second registration of the user equipment through a second network access upon receiving a second registration request from the user equipment, updating the first registration depending on a connection status of the user equipment with the registration node through the second network access.

According to a further example, an apparatus comprises means configured for performing: a first registration of a user equipment through a first network access upon receiving a first registration request from the user equipment, a second registration of the user equipment through a second network access upon receiving a first registration request from the user equipment, updating the first registration depending on a connection status of the user equipment with the registration node through the second network access.

The first network access may for example be a 3rd Generation Partnership Project (3GPP) access and the second network access may be a non-3GPP-access. The terms access, access network, network access and network access technology refer to the same meaning. For example, 3GPP access, 3GPP access network, 3GPP network access and 3GPP network access technology are regarded as being identical to one another.

In one example, the first and second network accesses may be non-3GPP accesses. In this example, at least part of messages used by the present subject matter for the update of the first registration may be keepalive messages. The keepalive messages may, for example, be provided in accordance with institute of electrical and electronics engineers (IEEE) and internet engineering task force (IETF) protocols.

The connection status of a UE to the registration node via the first network access is a state of a connection of the UE to the registration node via the first network access. The connection status of a UE to the registration node via the second network access is a state of a connection of the UE to the registration node via the second network access. The state of the connection may, for example, be an idle state or connected state. For example, the UE being in a connected state in a network access, means that the UE is connected to the registration node via the network access. The UE being in an idle state in a network access, means that the UE is not connected to the registration node via the network access. The idle state may, for example, be a Connection Management IDLE state (CM-IDLE). The connected state may, for example, be a CM-CONNECTED state.

The registration node may be a core network node of a network. The registration node may be configured to manage UE related functions in the network. For example, the registration node may be configured to perform or manage access and mobility functionalities in the network. The registration node is a single node of the network that manages registrations that are performed via (or over) different access networks by UEs. The network may for example be a 5G network or other networks that enables communication of UEs over different network access technologies. The registration node may be an access and mobility management function (AMF) of the 5G network. The first and second network accesses and the AMF may be part of a same public land mobile network (PLMN) of the 5G network.

A registration with the registration node may use a set of registration parameters. For example, the first registration may result in the set of registration parameters having values indicative of the first registration. The update of the first registration in accordance with the present subject matter may update a subset of the set of registration parameters. The update procedure may not include all parameters that are used in other registration cases.

For example, the first registration of the apparatus (or UE) to the registration node via the first network access is performed while the apparatus is in a given registration area. The update of the first registration is performed while the UE is in the same registration area e.g. the UE did not move from the given registration area to another registration area. The registration area may be a coverage area where services are provided by the first network access. For example, the first network access provides a basic coverage area and the second network access provides at least partially overlapping coverage area.

The features of "determining that the user equipment is not connected to the registration node via the first network access, in response to the determination and dependent upon the user equipment being connected to the registration node via the second network access, triggering of an update of the first registration via the second network access" may be referred to as an update step. The update step may, for example, be repeated. For example, the update step may automatically be performed if the UE moves from a connected state to an idle state in the first network access and if the first registration is valid. This may enable a periodic update. For example, the apparatus is configured to regularly check its connection status with the registration node via the first network access in order to perform the update step.

The performing of the first registration comprises performing a first registration procedure. The first registration procedure enables to register the UE with the network, and establish the user context in the network. The first registration may enable the UE to get authorized to receive services, to enable mobility tracking and to enable reachability via the first network access. The performing of the first registration may comprise initiating the first registration procedure. The UE initiates the first registration procedure by for example sending a first registration request message. The first registration procedure may comprise a signaling flow that involves at least the UE and the registration node. The UE may receive a registration accept message from the registration node via the first network access.

The performing of the second registration comprises performing a second registration procedure. The second registration procedure enables to register the UE with the network, and establish the user context in the network. The second registration may enable the UE to get authorized to receive services, to enable mobility tracking and to enable reachability via the second network access. The performing of the second registration may comprise initiating the second registration procedure. The UE initiates the second registration procedure by for example sending a second registration request message. The second registration procedure may comprise a signaling flow that involves at least the UE and the registration node. For example, the UE may receive a registration accept message from the registration node via the second network access.

The first registration may be performed before the second registration, after the second registration or concurrently with the second registration. Starting with the first registration may speed up a process in accordance with the present subject matter for the following reasons. For example, a 3GPP access has a wider network coverage area and the probability of the UE registering via the 3GPP access as the first network access may hence be higher. A non-3GPP access is provided by hotspots in specific areas—like home, shopping mall, transport terminals, etc. where the user enables manually to connect to such non-3GPP access using for example a wireless local area network (WLAN) or WiFi network. Hence the probability to connect via a non-3GPP access may be lower and hence this becomes the second network access. There may still be a possibility for the UE to turn on in an area where both 3GPP and non-3GPP access is available, due to signaling latency factors, the UE registers with the 3GPP access faster and hence becomes the first network access and later the UE registers with the non-3GPP access.

In one example, if the UE determines that it is connected to two different AMFs in the 3GPP and non-3GPP accesses, it may trigger a deregistration with the non-3GPP access and once again trigger a registration procedure via the non-3GPP access by providing a 5G Globally Unique Temporary Identifier (5G-GUTI) allocated by the AMF during the 3GPP access registration and then can be registered with the same AMF via both 3GPP and non-3GPP accesses. The connection status may indicate a connected state or idle state.

The update of the first registration may, for example, enable to update the location information of the UE with the registration node. With the update of the first registration, the UE may be reachable (again) by the registration node. The update of the first registration may for example be performed by an update procedure. The update procedure may comprise a part of the first registration procedure. The update procedure may, for example, be a periodic registration update procedure of the 5G network. The update may be triggered so that the update procedure may be performed. For example, the UE may be configured so that in response to determining that the UE is not connected (e.g. the UE moved from a connected state to an idle state) to the registration node via the first network access, a timer may start. Upon expiration of the timer, the update procedure may be performed. The timer may for example be the periodic registration update timer (e.g. T3512 timer) of the 5G network. The start of the timer may trigger the update. The UE may receive an initial value of the timer from the registration node during the first registration. The UE may start the timer with that initial value.

For example, the UE can have different connection configurations to the network. For example, in a first connection configuration the UE may register with the network via a single network access. In the first connection configuration, the UE may be in a connected state or idle state via the network access. In a second connection configuration, the UE may register to the network via two different network access technologies. In the second connection configuration, the UE may be in a connected state or idle state via each of the network access technologies. Thus, in each connection configuration, the UE may need to update one of its registrations if it is not connected anymore (idle) to the network via the respective network access. An example method to perform the update may consist of systematically and unconditionally executing the same update procedure via an access network, in each of the connection configurations, as soon as the UE is not reachable via said network access. However, this example method may not be efficient as it may involve unnecessary signaling data. The present subject matter may provide a solution that is adapted to the second connection configuration where the UE is registered with the network via two different network access technologies.

The present subject matter may optimize the update procedure for a UE that is registered with the registration node via two different network access technologies. For example, before updating a registration performed via a network access, the UE may check if it can make use of its registration via another network access. For example, if the UE is reachable though the other network access it may not need to perform the update as the UE is still reachable by the registration node. In another example, the UE may perform the update via the other network access. This may provide the UE with multiple possibilities for acting in case it is not reachable via one of the network access technologies. This may increase the implementation flexibility of the present subject matter. The present subject matter may make the registration node aware of the UE location (e.g. in terms of a network topology) for a potential paging even when there is no other traffic between the UE and the network.

According to an example, the performing of the first registration comprises receiving in a registration accept message, from the registration node, a value of a periodic registration update timer, wherein the timer is configured such that upon its expiration the update of the first registration is performed. The method further comprises preventing the start of the timer if the UE is connected to the registration node via the second network access. This may save processing resources, additional radio and signaling resources for the update procedure that would otherwise be required by a systematic and unconditional starting of the timer regardless of the connection configuration of the UE. The periodic registration update is performed by a UE in an idle state if there is no change in the registration area of the UE and a registration update timer expires.

In one example, the UE is configured to automatically perform the update of a registration to the network in response to determining that the UE has moved to an idle state. In case the UE is in the second connection configuration and the UE moves to an idle state e.g. the UE is not connected to the network via one of the network access technologies, the UE may be configured in accordance with the present subject matter to not execute the automatic update. Since the UE is in a connected state with the other network access the network may be aware that the UE is currently connected to the network (e.g. within a same PLMN) and not moved out of the network.

According to an example, the triggering of the update of the first registration is performed if the UE is not connected to the registration node via the second network access. In this example, the UE may have moved from a connected state to an idle state in the second network access. This may enable to keep the UE reachable by the network.

According to an example, the triggering of the update of the first registration is performed if the second registration is de-registered and the periodic registration update timer expires. This may enable to keep the network updated with current locations of the UE.

According to an example, the performing of the first registration comprises receiving in an accept message, from the registration node, a value of a periodic registration update timer. The triggering of the update comprises starting the periodic registration update timer. The method further comprises: in response to determining that the UE is connected with the registration node via the second network access, stopping the periodic registration update timer. The periodic registration update timer may start with the value. For example, while the periodic registration update timer is running, the UE may switch back to a connected state and may thus be reachable by the network. This may save processing resource that would otherwise be required by unnecessary update signaling.

According to an example, the triggering of the update further comprises, in response to determining that the UE is connected with the registration node via the second network access sending via the second network access a registration request to the registration node for updating the first registration.

According to an example, the performing of the second registration further comprises sending a registration request to the registration node. The registration request comprises a first request for the second registration and a second request for an update of the first registration using the second network access, wherein the triggering of the update is performed in response to receiving a confirmation of the second request.

According to an example, the second request comprises a flag, wherein the confirmation of the second request comprises the flag being set to a predefined value. This may enable a systematic and reliable method for coordination of the registration updates between the UE and the registration node.

The updating of the first registration in accordance with the present subject matter may be enabled or disabled by setting the flag accordingly. The registration node may set the flag as true/enabled or false/disabled during the second registration procedure. During the second registration procedure, if the registration node discovers that it does have the UE context from the first registration served by it, when the UE is either in an idle or connected state, then the registration node may set the flag to the true value in the registration accept message of the second registration procedure. During the second registration procedure, if the registration node discovers that it does not have the UE context from the first registration served by it, then it may set the flag to the false value in the registration accept message of the second registration procedure. When the flag is set to the false value, it means that the updating of the first registration in accordance with the present subject matter may not be supported and hence not applicable. The flag may be set only when the UE is doing the second registration procedure with a first registration with the registration node being previously performed via another access network technology.

For example, in case of a 5G network, when the UE triggers a registration procedure for the first time either with the 3GPP access or non-3GPP access, then the flag is not sent by the UE in the registration request of said registration procedure. When the UE is already registered with either the 3GPP access or non-3GPP access and uses the previously assigned 5G-GUTI in the registration procedure with a $2^{nd}$ access (either the non-3GPP or 3GPP access), so as to be served by the same AMF in the same PLMN, only then the UE sets this flag in the registration request. The AMF may send this flag (set to either true or false), only when it receives the flag from the UE in registration request message.

According to an example, the first network access and the second network access are 3GPP access and non-3GPP access, respectively.

The registration node may for example be an AMF of a 5G network. For example, in a 5G network, a UE performs the periodic registration update procedure in 3GPP access, with the expiration of the periodic update timer to notify the AMF that the UE is still active. The AMF may not provide the periodic registration timer for the UE over a non-3GPP access. Consequently, the UE may not perform the periodic registration update procedure over the non-3GPP access.

With the present subject matter, the periodic registration update procedure may be optimized for the UEs being in a connection configuration as described herein. Since a common AMF of the same PLMN serves the UE in both, 3GPP access and non-3GPP access, a periodic registration update over the 3GPP access can be avoided as long as the UE remains reachable via the non-3GPP access (the UE is in a connected state in the non-3GPP access).

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. The embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network. FIG. 1 shows devices 10 and 12. The devices 10 and 12 may, for example, be user devices. The devices 10 and 12 are configured to be in a wireless connection on one or more communication channels with a node 14. The node 14 is further connected to a core network 20. In one example, the node 14 may be an access node (such as (e/g)NodeB) 14 providing or serving devices in a cell. In one example, the node 14 may be a non-3GPP access node. The physical link from a device to a (e/g)NodeB is called uplink or reverse link and the physical link from the (e/g)NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 20 (CN or next generation core NGC). Depending on the system, the counterpart on the CN side can be a serving gateway (S-GW, routing and forwarding user data packets), packet data network gateway (P-GW), for providing connectivity of devices (UEs) to external packet data networks, or mobile management entity (MME), etc.

The device (also called user device, UE, user equipment, user terminal, terminal device, etc.) illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station.

The device typically refers to a device (e.g. a portable or non-portable computing device) that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The device may also utilize cloud. In some applications, a device may comprise a user portable device with radio parts (such as a watch, earphones or eyeglasses) and the computation is carried out in the cloud. The device (or in some embodiments a layer 3 relay node) is configured to perform one or more of user equipment functionalities. The device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 22, or utilize services provided by them. The communication network may also be able to support the usage of cloud services, for example at least part of core network operations may be carried out as a cloud service (this is depicted in FIG. 1 by "cloud" 24). The communication system may also comprise a central control entity, or a like, providing facilities for networks of different operators to cooperate for example in spectrum sharing.

The technology of Edge cloud may be brought into a radio access network (RAN) by utilizing network function virtualization (NVF) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 14) and non-real time functions being carried out in a centralized manner (in a centralized unit, CU 18).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 16 in the mega-constellation may cover several satellite-enabled network entities that create on-ground cells. The on-ground cells may be created via an on-ground relay node 14 or by a gNB located on-ground or in a satellite.

It is obvious for a person skilled in the art that the depicted system is only an example of a part of a radio access system and in practice, the system may comprise a plurality of (e/g)NodeBs, the device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figure 2:
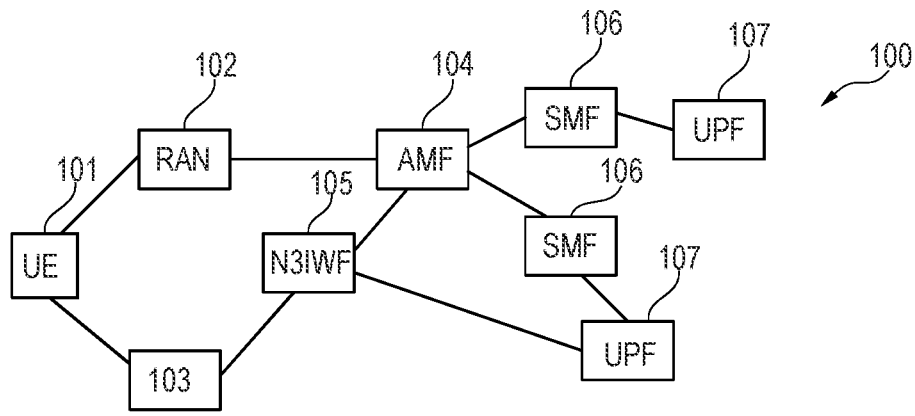
FIG. 2 illustrates a wireless communication network.

FIG. 2 illustrates a wireless communication network 100. The terms "wireless communication network", and "wireless network" are used interchangeably herein to generally describe a communication network that is operable to provide mobile communication to its subscribers. For example, the wireless communication network 100 may be at least part of a 5G network (e.g. as described with reference to FIG. 1) that is generally compliant with technical specifications and technical reports for a 3rd Generation Mobile System that have been developed by the 3GPP. It should be understood, however, that the present subject matter may be applicable to wireless communication networks supporting other wireless protocols.

The wireless communication network 100 allows one or more UEs 101 to access the wireless communication network 100 via a 3GPP network access that is represented by a radio access network (RAN) 102 (such as node 14 of FIG. 1) and to access the wireless communication network 100 via a non-3GPP network access that is represented by an access node 103 to use a common access and mobility management function (AMF) 104.

FIG. 2 illustrates a case in which the common AMF 104 is selected when the UE 101 accesses the wireless communication network 100 via the 3GPP network access 102 and at the same time, the UE 101 accesses the wireless communication network 100 via the non-3GPP access 103. The UE 101 accesses the wireless communication network 100 via the 3GPP network access 102 and via the non-3GPP network access 103 respectively, and the AMF 104 separately performs registration management with respect to the 3GPP and the non-3GPP.

The wireless communication network 100 comprises a non-3GPP interworking function (N3IWF) 105 that is configured for interworking of the non-3GPP network access 103 and the wireless communication network 100. The N3IWF 105 is configured to forward a non-access stratum (NAS) message or data transmitted and received via the non-3GPP network access 103. A session management function (SMF) 106 is an entity serving to manage a session and allocate an Internet protocol (IP) address to the UE 101, and a user plane function (UPF) 107 serves to forward user data according to a control of the SMF.

For example, when a large number of UEs is connected to the network 100, served by the same AMF 104 in both 3GPP access and non-3GPP access (in the same PLMN) and a user prefers to use the non-3GPP access for any data usage, this would lead to a condition (or connection configuration), where the UE state in the 3GPP access will be an idle state and the UE state in the non-3GPP access is a connected state. During this condition, such UE may be configured to perform a regular periodic registration update procedure over the 3GPP access to indicate its reachability to the network. The present subject matter may prevent that a large number of such UEs in such state of connection and usage, uses a large number of signaling by preventing such UEs performing the regular periodic registration update procedure.

Figure 3:
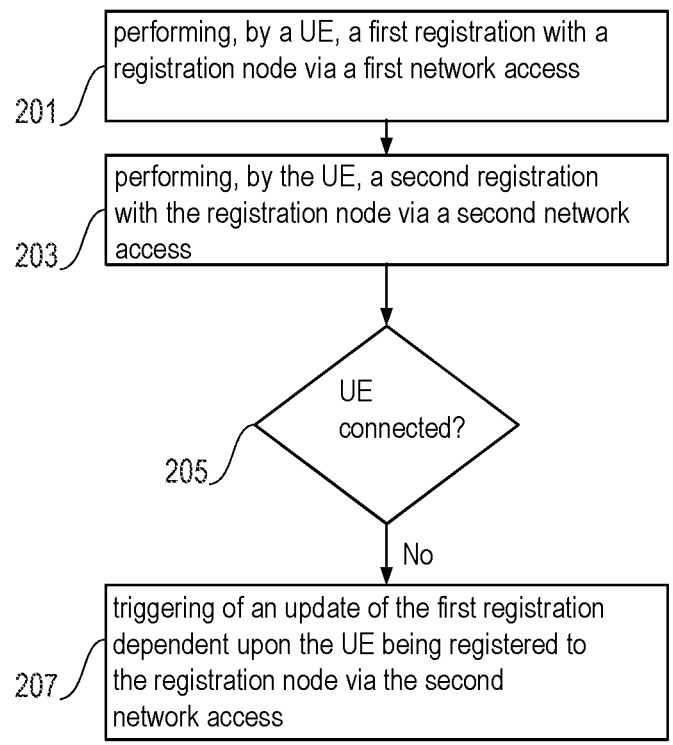
FIG. 3 is a flowchart of a method for registration of a user equipment (UE) in accordance with an example of the present subject matter.

FIG. 3 is a flowchart of a method for registration of a user equipment in accordance with an example of the present subject matter. For the purpose of explanation, the method described in FIG. 3 may be implemented in the wireless communication network illustrated in FIG. 2, but is not limited to this implementation.

The UE 101 may perform in step 201 a first registration with a registration node such as the AMF 104 via a first network access e.g. 102. For example, the UE 101 may initiate a first registration procedure with the AMF 104. This may be performed by sending by the UE 101 a first registration request to the AMF 104 via the first network access 102. The first registration request may be a first step, of the first registration procedure, which triggers a sequence of further steps that result in the UE being registered at the wireless communication network via the first network access 102. The steps of the first registration procedure may comprise signaling of data that involves at least the UE 101 and the AMF 104. For example, the UE 101 may receive from the AMF 104 a registration accept message. The registration accept message may comprise a periodic registration updating/update timer value e.g. T3512 timer.

The periodic registration updating timer may be used by the UE in order to trigger an update of the first registration. Triggering the update may for example comprise starting the periodic registration updating timer and upon expiration of the periodic registration updating timer, a periodic registration update procedure may start. The periodic registration update timer is not running when the UE is in a connected state (e.g. as based on a known serving cell, the network is aware of the UE location).

The first registration may, for example, be performed while the UE is in a given registration area. The registration area is an area that is served by the first network access e.g. the registration area may be a coverage area of the RAN 102.

The first registration may be performed in a PLMN which may be a registered PLMN (RPLMN) if the first registration is successful.

The UE 101 may perform in step 203 a second registration with the registration node via a second network access 103. For example, the UE 101 may initiate a second registration procedure with the AMF 104. This may be performed by sending by the UE 101 a second registration request to the AMF 104 via the second network access 103. The second registration request may be a first step, of the second registration procedure, which triggers a sequence of further steps that result in the UE being registered at the wireless communication network via the second network access 103. At least the UE 101 and the AMF 104 may be involved during the second registration procedure.

In one example, the second registration may be performed after the first registration. In another example, the second registration may be performed before the first registration. The first network access and the second network access are 3GPP access and non-3GPP access, respectively.

The second registration may be performed in the same PLMN. That is, the UE has registered to the same network (i.e. PLMN) as a serving 3GPP network (RPLMN).

After performing the first and second registrations, the UE 101 may be in a connected state in both the first and second network access technologies 102 and 103. This may enable the UE 101 to be served by the same AMF 104 (within a same PLMN) in both 3GPP access and non-3GPP access. The UE 101 being in a connected state in the first network access means that the UE 101 is connected to the AMF 104 via the first network access. The UE 101 being in a connected state in the second network access means that the UE 101 is connected to the AMF 104 via the second network access.

However, the UE 101 may change its connection status via one of or via both of the first and second network access technologies. For example, the UE 101 may move or switch from the connected state to an idle state in the first network access. The UE 101 being in an idle state in the first network access means that the UE 101 is not connected to the AMF 104 via the first network access. This may result in the UE 101 being not reachable by the AMF 104 via the first network access if, for example, the UE moves out of the network in this idle state.

If (inquiry step 205) the UE is not connected to the registration node via the first network access, the UE 101 may trigger in step 207 an update of the first registration with the registration node. This may be performed depending on a connection status of the UE with the registration node via the second network access.

For example, the periodic registration updating timer may not need to be started in step 207 if the UE is connected via the second network access to the AMF 104. This is because the AMF 104 can reach the UE via the second network access. Thus, the periodic registration update procedure may not be needed to update the first registration as the AMF 104 already has access to the UE 101 via the second network access.

In an alternative example, the UE may start in step 207 the periodic registration updating timer and upon expiration of the periodic registration updating timer, the UE 101 may perform the periodic registration update procedure with the AMF 104 via the second network access since the UE is in a connected state via the second network access. For example, when the UE moves to a CM Idle state, it may start the periodic registration update timer with the value issued by the AMF.

Step 207 may be performed while the UE is in the same registration area. That is, during the execution of the method of FIG. 3, the UE did not move from the given registration area to another registration area. In one example, steps 205-207 may be repeated e.g. on a periodic basis. The repetition of steps 205-207 may enable a periodic update.

In one example, while the first registration is still valid, the UE may perform a third registration to the registration node via a third network access. The second registration may not be valid anymore. This may be the case, if the UE has moved, within the same registration area, from one location that is served by the second network access to another location served by the third network access. In this case, steps 205-207 may be repeated using the third registration instead of the second registration. That is, the update of the first registration may be performed based on the connection status of the UE to the registration node via the third network access.

Figure 4:
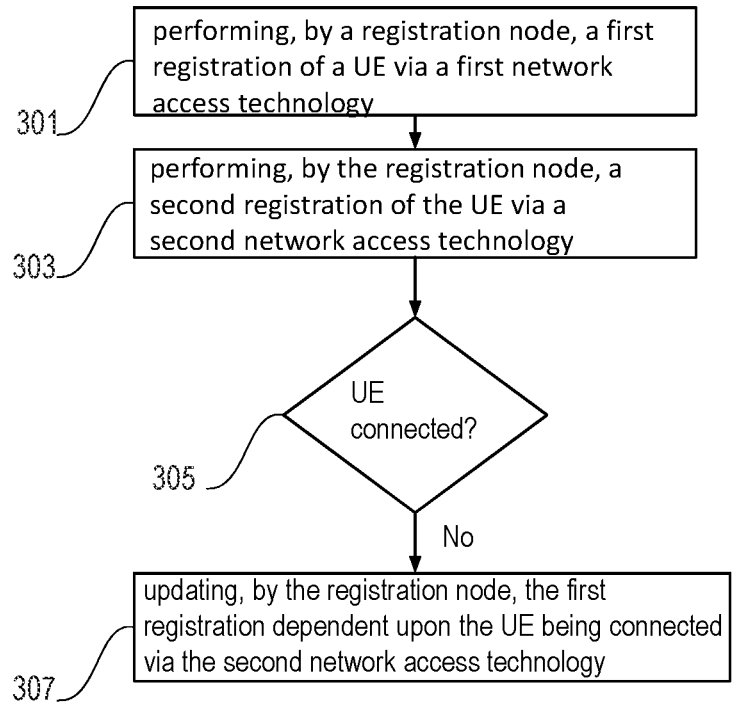
FIG. 4 is a flowchart of a method for registration of a user equipment in accordance with an example of the present subject matter.

FIG. 4 is a flowchart of a method for registration of a user equipment in accordance with an example of the present subject matter. For the purpose of explanation, the method described in FIG. 4 may be implemented in the wireless communication network illustrated in FIG. 2, but is not limited to this implementation.

The AMF 104 may perform in step 301 a first registration of a UE 101 via a first network access e.g. 102. For example, a first registration procedure with the UE 101 may be initiated. This may be performed by receiving at the AMF 104 from the UE 101 a first registration request via the first network access 102. The first registration request may be a first step, of the first registration procedure, which triggers a sequence of further steps that result in registering the UE at the wireless communication network via the first network access 102. The steps of the first registration procedure may comprise signaling of data that involves at least the UE 101 and the AMF 104. For example, the AMF 104 may send to the UE 101 a registration accept message. The registration accept message may comprise a periodic registration updating timer e.g. T3512 timer.

The periodic registration updating timer may be used by the AMF 104 for determining when the UE may be de-registered if the UE is not reachable within the network coverage or moved out of network coverage. The AMF 104 may determine that the UE is in an idle state as follows. When the UE is in a connected state, the UE has a radio resource control (RRC) connection with the RAN 102 and has a logical N2 connection with the AMF 104. When either the UE or the AMF decides to move the UE to the idle state, both the RRC connection with the RAN 102 and N2 signaling with AMF 104 is released (either UE triggered or network triggered). This may indicate to the AMF 104 that the UE is in the idle state.

The AMF 104 may perform in step 303 a second registration of the UE 101 via a second network access 103. For example, a second registration procedure with the UE 101 may be initiated. This may be performed by receiving at the AMF 104 from the UE 101 a second registration request via the second network access 103. The second registration request may be a first step, of the second registration procedure, which triggers a sequence of further steps that result in registering the UE 101 at the wireless communication network via the second network access 103. During the second registration procedure, at least the UE 101 and the AMF 104 may be involved in signaling data of the second registration procedure.

In one example, the second registration may be performed after the first registration. In another example, the second registration may be performed before the first registration. The first network access and the second network access 102 and 103 are 3GPP access and non-3GPP access, respectively. After performing the first and second registration, the UE 101 may be in a connected state in both the first and second network access technologies 102 and 103. This may enable the AMF 104 to serve the UE 101 (within the same PLMN) in both 3GPP access and non-3GPP access.

However, the UE 101 may change its connection status via one of or via both of the first and second network access technologies. For example, the UE 101 may move or switch from the connected state to an idle state in the first network access. The UE 101 being in an idle state in the first network access means that the UE 101 is not connected to the AMF 104 via the first network access. This may result in the UE 101 being not reachable by the AMF 104 via the first network access if the UE moves out of the network in this idle state.

If (inquiry step 305) the UE is not connected to the registration node via the first network access, the AMF 104 may not start the periodic registration updating timer in step 307. In an alternative example, the AMF 104 may start in step 307 the periodic registration updating timer and upon expiration of the periodic registration updating timer, the periodic registration update procedure may be performed between the AMF 104 and the UE 101 via the second network access if the UE initiates the periodic registration update procedure. For example, the UE may initiate the periodic registration update procedure related with the first registration over the second network access by sending a registration request message to the AMF 104.

Figure 5:
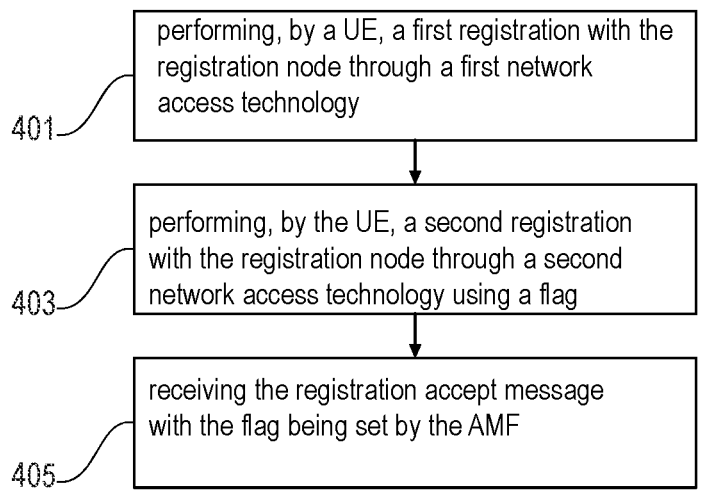
FIG. 5 is a flowchart of a method for enabling registration of a UE with a registration node in accordance with an example of the present subject matter.

FIG. 5 is a flowchart of a method for enabling a registration of a UE with a registration node e.g. AMF 104 in accordance with an example of the present subject matter.

The UE 101 may perform in step 401 a first registration with a registration node such as the AMF 104 via a first network access 102. For example, the UE 101 may initiate a first registration procedure with the AMF 104. This may be performed by sending by the UE 101 a first registration request message to the AMF 104 via the first network access 102. The first registration request message may be a first step, of the first registration procedure, which triggers a sequence of further steps that result in the UE being registered at the wireless communication network 100 via the first network access 102. The steps of the first registration procedure may comprise signaling of data that involves at least the UE 101 and the AMF 104.

The UE 101 may perform in step 403 a second registration with the registration node via a second network access 103. For example, the UE 101 may initiate a second registration procedure with the AMF 104. This may be performed by sending by the UE 101 a second registration request message to the AMF 104 via the second network access 103. The second registration request message may be a first step, of the second registration procedure, which triggers a sequence of further steps that result in the UE being registered at the wireless communication network via the second network access 103.

The UE 101 may use the second registration to indicate the support of UE reachability management via the second network access e.g. via a non-3GPP connectivity. For that, a flag may be sent in the second registration request message. The AMF 104 may be configured to set the flag to a predefined value in response to receiving it from the UE 101. The flag may have a true or false value. For example, if the AMF 104 discovers that it does have the UE context from the first access (non-3GPP/3GPP) served by it when it is either in the CM-Idle/CM-Connected state, then the AMF 104 may set the flag as true in the registration accept message of the second registration procedure. If the AMF 104 discovers that it does not have the UE context from the first access (non-3GPP/3GPP) served by it, then the AMF 104 may set the flag as false in the registration accept message of the second registration procedure.

In one example, the flag may be a first type flag to indicate "UE reachability management via non-3GPP access without N2 signaling" for the case where the UE may prevent the start of a timer (e.g. if the first type flag is set to true) or a second type flag to indicate "UE reachability management via non-3GPP access with N2 signaling" for the case where the UE may do the registration update via the second network access e.g. if the second type flag is set to true. The UE may set either one of the two type flags or both at a time in the second registration. The AMF may set either one of the two type flags and not both.

The UE 101 may receive in step 405, the registration accept message with the flag being set by the AMF as described herein. Based on the received set flag, the UE may perform the update accordingly.

Figure 6:
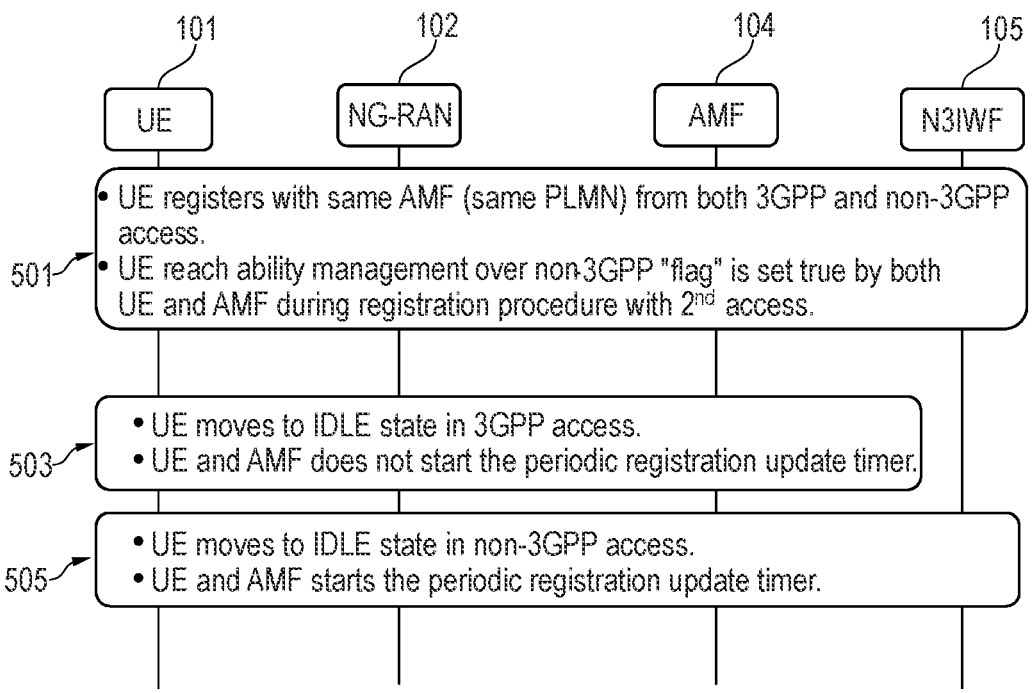
FIG. 6 is a message flow diagram illustrating a method for performing a periodic update registration in accordance with an example of the present subject matter.

FIG. 6 is a message flow diagram illustrating a method for performing a periodic update registration in accordance with an example of the present subject matter.

The UE 101 registers (501) with a same AMF 104 via both a 3GPP network access 102 and a non-3GPP network access 103. For that, the UE 101 may perform a first registration with the AMF 104 via one network access of the 3GPP network access and non-3GPP network access followed by a second registration with the AMF 104 via the other network access of the 3GPP network access and non-3GPP network access. The UE 101 may then be served by the same AMF 104 in both 3GPP and non-3GPP network access technologies. For example, a same 5G-GUTI may be assigned to the UE 101 for the two registrations. The 3GPP network access is represented by the next-generation RAN (NG-RAN) node which may be a gNB or a ng-eNB.

During registration, the UE 101 may indicate the support of UE reachability management via a non-3GPP connectivity based on a flag. The flag may for example be sent in a registration request message during the second registration. The flag may for example indicate "UE reachability management via non-3GPP access without N2 signaling". The flag may, for example, be defined within a 5G system mobility management (5GMM) capability information element (IE). The purpose of the 5GMM capability IE is to provide the network with information concerning aspects of the UE related to the 5G core network (5GCN) or interworking with the evolved packet system (EPS). In one example, the flag may be the spare 0 (bit 4 in octet 3) and/or the spare 0 (bit 5 in octet 3) of the 5GMM capability IE. In another example, the flag may be the spare 0 (bit 3 in octet 4) and/or the spare 0 (bit 4 in octet 4) of the 5GS capability IE. The value of the spare 0 may be 0—meaning the present method is not supported or 1—meaning the present method is supported.

If the AMF 104 discovers that it does have the UE context from the previous access (non-3GPP/3GPP) served by it when it is either in CM-Idle/CM-Connected state, then the AMF 104 would set the flag as true in the registration accept message of the second registration. In this case, the flag is set to true by both the UE 101 and the AMF 104 during the registration procedure with the second network access.

The registration of the UE 101 with the AMF 104 via the 3GPP network access 102 may comprise the reception from the AMF 104 of a periodic registration update timer for the 3GPP network access e.g. T3512 timer, at the UE 101.

The UE 101 moves (503) to the idle state in the 3GPP network access and it is still in the connected state in the non-3GPP network access. In this case the timer is not started at both the UE and the AMF. This may make use of the fact that the AMF has access to the location of the UE since the UE is in the connected state in the non-3GPP network access.

The UE 101 moves (505) to the idle state in the non-3GPP network access. This may result in the periodic registration update timer being started at the UE 101 and at the AMF 104.

Figure 7:
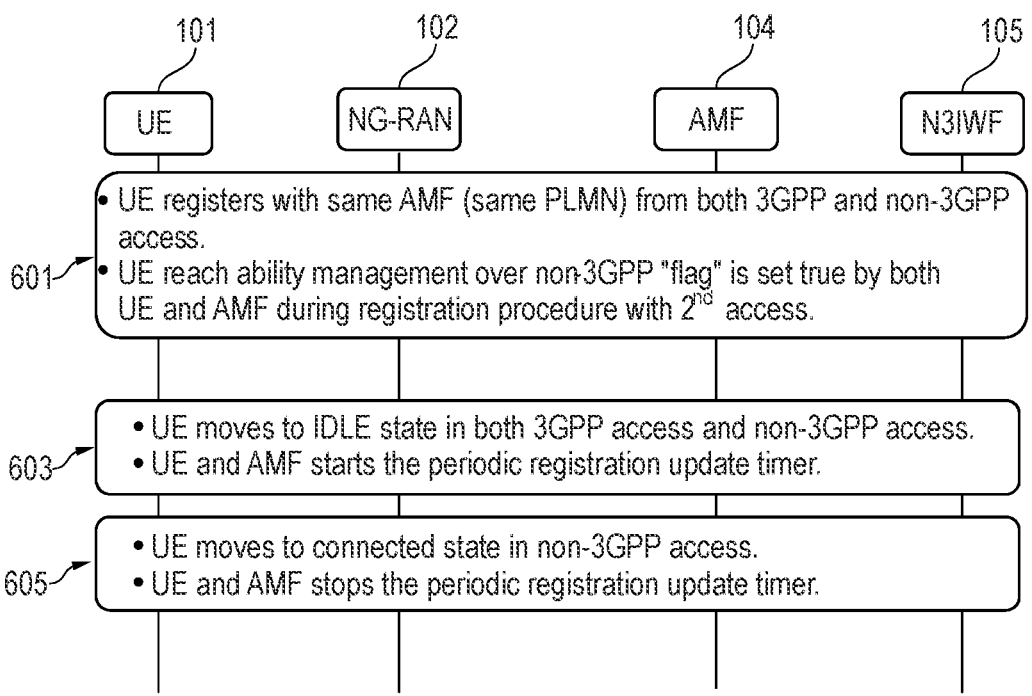
FIG. 7 is a message flow diagram illustrating a method for performing a periodic update registration in accordance with an example of the present subject matter.

FIG. 7 is a message flow diagram illustrating a method for performing a periodic update registration in accordance with an example of the present subject matter.

The UE 101 registers (601) with a same AMF 104 via both a 3GPP network access 102 and a non-3GPP network access 103. For that, the UE 101 may perform a first registration with the AMF 104 via one network access of the 3GPP network access or non-3GPP network access followed by a second registration with the AMF via the other network access of the 3GPP network access or non-3GPP network access. The UE 101 may then be served by the same AMF 104 in both 3GPP and non-3GPP network access technologies. For example, a same 5G-GUTI may be assigned to the UE 101 for the two registrations. For example, the 5G-GUTI assigned to the UE during the first registration may be used by the UE to identify the core network's AMF (or perform an AMF selection) during the second registration and if the same AMF is selected to serve the UE in the second registration, then the same 5G-GUTI may be retained.

During registration, the UE 101 may indicate the support of UE reachability management via a non-3GPP connectivity based on a flag. The flag may for example be sent in a registration request message during the second registration. The flag may for example indicate "UE reachability management via non-3GPP access without N2 signaling" defined within a 5GMM capability IE.

If the AMF 104 discovers that it does have the UE context from the previous access (non-3GPP/3GPP) served by it when it is either in the CM-Idle/CM-Connected state, then the AMF 104 would set the flag as true in the registration accept message of the second registration. In this case, the flag is set to true by both the UE 101 and the AMF 104 during the registration procedure with the second network access.

The registration of the UE 101 with the AMF 104 via the 3GPP network access 102 may comprise the reception from the AMF 104 of a periodic registration update timer for 3GPP network access e.g. T3512 timer, at the UE 101.

The UE 101 moves (603) to the idle state in the 3GPP network access and to the idle state in the non-3GPP network access. This may result in the periodic registration update timer being started at the UE 101 and at the AMF 104.

While the timer is running, the UE 101 moves (605) to the connected state in the non-3GPP network access. In this case, the UE 101 and AMF 104 stop the timer.

Figure 8:
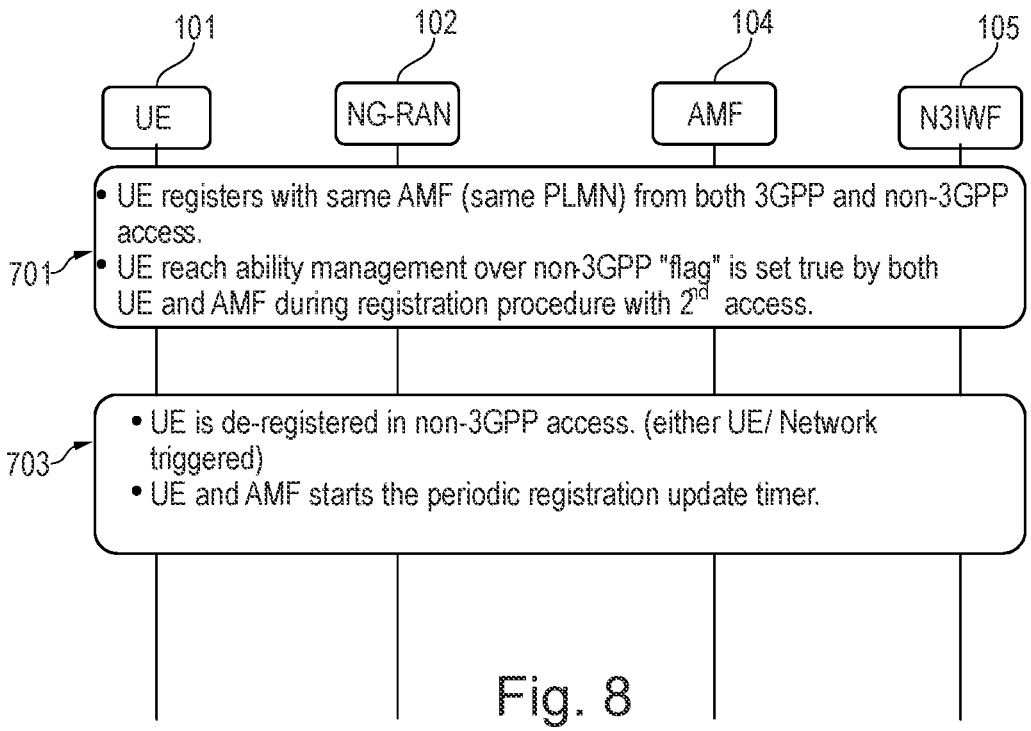
FIG. 8 is a message flow diagram illustrating a method for performing a periodic update registration in accordance with an example of the present subject matter.

FIG. 8 is a message flow diagram illustrating a method for performing a periodic update registration in accordance with an example of the present subject matter.

The UE 101 registers (701) with a same AMF 104 via both a 3GPP network access 102 and a non-3GPP network access 103. For that, the UE 101 may perform a first registration with the AMF 104 via one network access of the 3GPP network access or non-3GPP network access followed by a second registration with the AMF 104 via the other network access of the 3GPP network access or non-3GPP network access. The UE 101 may then be served by the same AMF 104 in both 3GPP and non-3GPP network access technologies. For example, a same 5G-GUTI may be assigned to the UE 101 for the two registrations. For example, the 5G-GUTI assigned to the UE during the first registration may be used by the UE to identify the core network's AMF (or perform an AMF selection) during the second registration and if the same AMF is selected to serve the UE in the second registration, then the same 5G-GUTI may be retained.

During registration, the UE 101 may indicate the support of UE reachability management via a non-3GPP connectivity based on a flag. The flag may for example be sent in a registration request message during the second registration. The flag may for example indicate "UE reachability management via non-3GPP access without N2 signaling" defined within a 5GMM capability IE.

If the AMF 104 discovers that it does have the UE context from the previous access (non-3GPP/3GPP) served by it when it is either in the CM-Idle/CM-Connected state, then the AMF 104 would set the flag as true in the registration accept message of the second registration. In this case, the flag is set to true by both the UE 101 and the AMF 104 during registration procedure with the second network access.

The registration of the UE 101 with the AMF 104 via the 3GPP network access 102 may comprise the reception from the AMF 104 of a periodic registration update timer for the 3GPP network access e.g. T3512 timer, at the UE 101.

When the UE is in the idle state in the 3GPP network access and gets (703) de-registered (detach) in non-3GPP access, then the periodic registration timer for the 3GPP network access is started at both the UE 101 and AMF 104. The de-registration is either UE triggered, or network triggered.

With the method of FIG. 6, FIG. 7 or FIG. 8, radio resources and control plane signaling messages may be reduced by avoiding periodic registration procedures for the UE which are reachable via non-3GPP access by the AMF. This may result in significant cost and energy savings for both UE and the RAN network. This may help in an optimized utilization of the resources.

Figure 9:
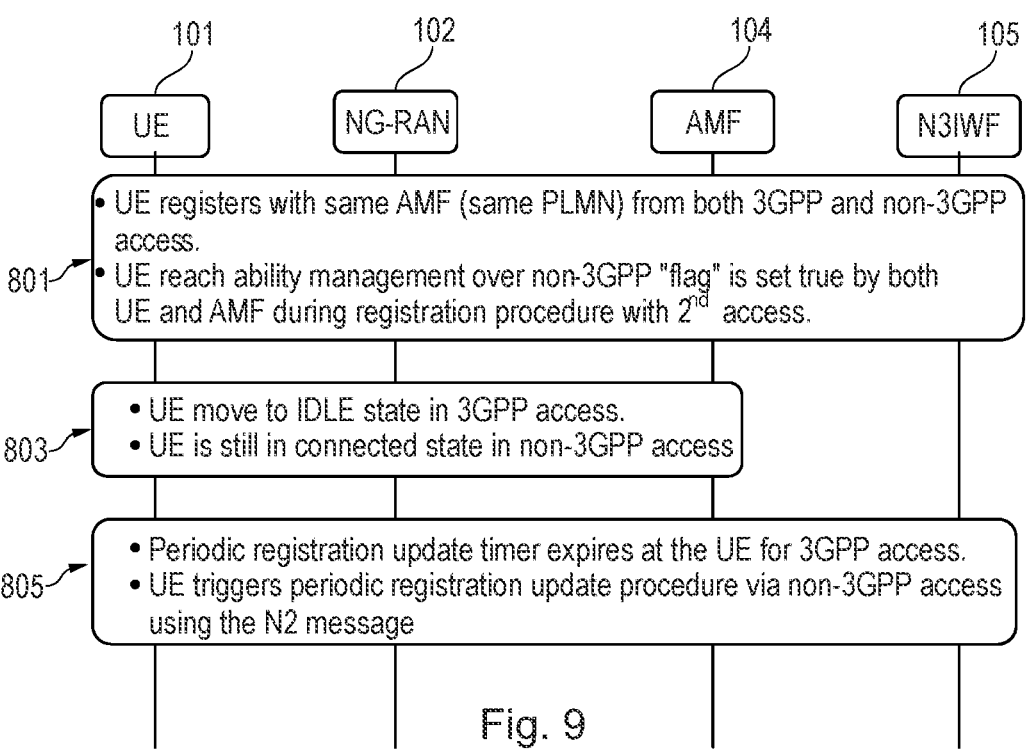
FIG. 9 is a message flow diagram illustrating a method for performing a periodic update registration in accordance with an example of the present subject matter.

FIG. 9 is a message flow diagram illustrating a method for performing a periodic update registration in accordance with an example of the present subject matter.

The UE 101 registers (801) with a same AMF 104 via both a 3GPP network access 102 and a non-3GPP network access 103. For that, the UE 101 may perform a first registration with the AMF 104 via one network access of the 3GPP network access or non-3GPP network access followed by a second registration with the AMF 104 via the other network access of the 3GPP network access or non-3GPP network access. The UE 101 may then be served by the same AMF 104 in both 3GPP and non-3GPP network access technologies. For example, a same 5G-GUTI may be assigned to the UE 101 for the two registrations.

During registration, the UE 101 may indicate the support of UE reachability management via a non-3GPP connectivity based on a flag. The flag may for example be sent in a registration request message during the second registration. The flag may for example indicate "UE reachability management via non-3GPP access with N2 signaling" defined within a 5GMM capability IE.

If the AMF 104 discovers that it does have the UE context from the previous access (non-3GPP/3GPP) served by it when it is either in the CM-Idle/CM-Connected state, then the AMF 104 would set the flag as true in the registration accept message of the second registration. In this case, the flag is set to true by both the UE 101 and the AMF 104 during registration procedure with the second network access.

The registration of the UE 101 with the AMF 104 via the 3GPP network access 102 may comprise the reception from the AMF 104 of a periodic registration update timer for the 3GPP network access e.g. T3512 timer, at the UE 101.

The UE 101 moves (803) to the idle state in the 3GPP network access and it is still in the connected state in the non-3GPP network access. This may result in the periodic registration update timer being started at the UE 101.

After the periodic registration timer expires (805) at the UE 101, the UE triggers a periodic registration update procedure via the non-3GPP network access using N2 messaging. For example, the UE 101 may send a registration request via the N2 message and may proceed with the periodic registration update procedure for 3GPP access via the non-3GPP access. The registration request is sent with the 5GS registration type set as "periodic registration updating". Since the AMF 104 is aware that the same UE 101 is being served in both the non-3GPP and 3GPP network access technologies e.g. based on the same 5G-GUTI being used, hence when the AMF 104 receives the registration request from the UE 101 over the non-3GPP network access with the registration type set as "periodic registration updating", the AMF 104 understands that the procedure is for the UE 101 in the 3GPP network access and since the UE 101 is in the connected state via the non-3GPP network access, the UE 101 is sending it via the non-3GPP network access using the N2 messages and completes the procedure successfully.

With the present method, radio resources, on the 3GPP access side, cost may be saved as the NAS signaling for the periodic registration update procedure happens via the non-3GPP access where the UE is already in a connected state. In addition, there may be no need to stop the periodic registration update timer at both the UE and AMF.

Figure 10:
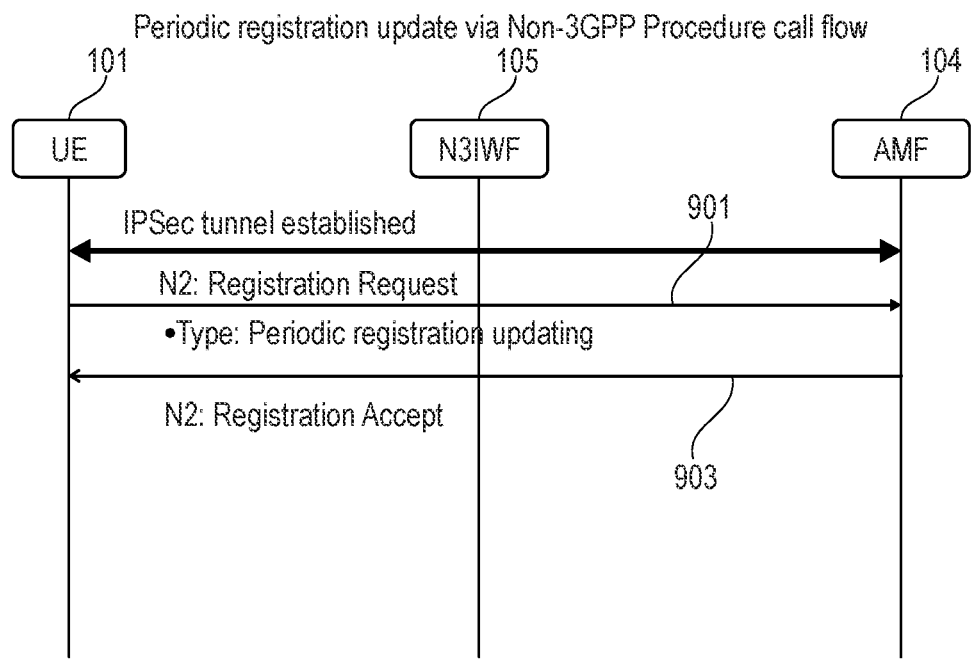
FIG. 10 is a message flow diagram illustrating a method for performing a periodic update registration in accordance with an example of the present subject matter.

FIG. 10 is a message flow diagram illustrating a method for performing a periodic update registration in accordance with an example of the present subject matter.

The UE 101 is registered with the same AMF 104 in both the 3GPP and non-3GPP accesses (in the same PLMN). The UE 101 moves to the idle state in the 3GPP access but remains in the connected state in the non-3GPP access. And the periodic registration update timer expires at the UE. In this case, the UE initiates a periodic registration update procedure by sending (901) the registration request via the non-3GPP access using the N2 message with the type set as "periodic registration updating" e.g. after an IPsec tunnel is established between the UE 101 and the AMF 104. The AMF 104 understands that the UE 101 is triggering the periodic registration update procedure for the UE in the 3GPP access but the signaling is done via the non-3GPP access, since it is in the connected state in the non-3GPP access and completes the procedure successfully. The AMF 104 may send (903) a registration accept message using a N2 message.

Figure 11:
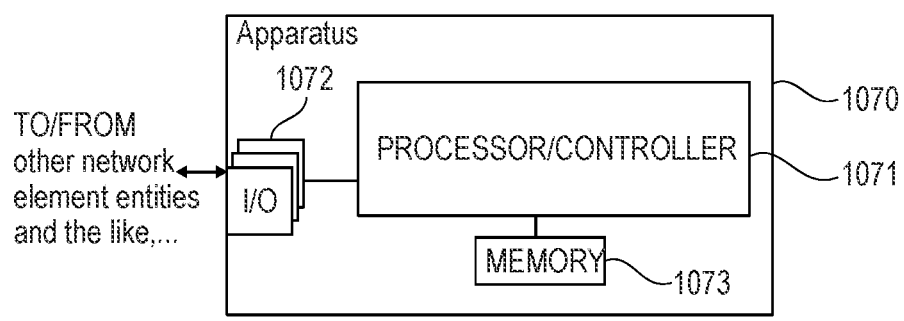
FIG. 11 is a block diagram showing an example of an apparatus according to an example of the present subject matter.

FIG. 11 is a block diagram showing an example of an apparatus according to an example of the present subject matter.

In FIG. 11, a block circuit diagram illustrating a configuration of an apparatus 1070 is shown, which is configured to implement at least part of the present subject matter. It is to be noted that the apparatus 1070 shown in FIG. 11 may comprise several further elements or functions besides those described herein below, which are omitted herein for the sake of simplicity as they are not essential for the understanding. Furthermore, the apparatus may be also another device having a similar function, such as a chipset, a chip, a module etc., which can also be part of an apparatus or attached as a separate element to the apparatus 1070, or the like. The apparatus 1070 may comprise a processing function or processor 1071, such as a central processing unit (CPU) or the like, which executes instructions given by programs or the like related to a flow control mechanism. The processor 1071 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 1072 denotes transceiver or input/output (I/O) units (interfaces) connected to the processor 1071. The I/O units 1072 may be used for communicating with one or more other network elements, entities, terminals or the like. The I/O units 1072 may be a combined unit comprising communication equipment towards several network elements, or may comprise a distributed structure with a plurality of different interfaces for different network elements. Reference sign 1073 denotes a memory usable, for example, for storing data and programs to be executed by the processor 1071 and/or as a working storage of the processor 1071.

The processor 1071 is configured to execute processing related to the above described subject matter. In particular, the apparatus 1070 may be configured to perform at least part of the method as described in connection with FIGS. 3 to 9.

The processor 1071 is configured to perform a first registration of a UE with a registration node via a first network access, perform a second registration with the registration node via a second network access, and in response to determining that the UE is not connected to the registration node via the first network access, trigger an update of the first registration with the registration node depending on a connection status of the UE with the registration node via the second network access.

The processor 1071 is configured to perform a first registration of a user equipment, UE, via a first network access; perform a second registration of the UE via a second network access; update the first registration depending on a connection status of the UE via the second network access.

The invention claimed is:

1. An apparatus, comprising:
   at least one processor; and
   at least one memory including computer program code, the at least one memory and the computer program code being configured, with the at least one processor, to cause the apparatus to perform:
   a first registration with a registration node via a first network access;
   a second registration with the registration node via a second network access;
   a determination that the apparatus is not connected to the registration node via the first network access; and
   in response to the determination and dependent upon a connection status of the apparatus to the registration node via the second network access, triggering of an update of the first registration via the second network access.

2. The apparatus of claim 1, the memory and the computer program code being configured, with the processor, to cause the apparatus to perform the first registration by receiving in a registration accept message, from the registration node, a value of a periodic registration update timer, wherein the timer is configured such that upon its expiration the update of the first registration is performed and preventing a start of the timer if the apparatus is connected to the registration node via the second network access.

3. The apparatus of claim 1, wherein the memory and the computer program code are configured, with the processor, to cause the apparatus to perform triggering of the update of the first registration if the apparatus is not connected to the registration node via the second network access.

4. The apparatus of claim 1, wherein the memory and the computer program code are configured, with the processor, to cause the apparatus to perform triggering of the update of the first registration if the second registration is de-registered.

5. The apparatus of claim 3, wherein the memory and the computer program code being configured, with the processor, to cause the apparatus to perform the first registration by receiving in a registration accept message, from the registration node, a value of a periodic registration update timer, triggering of the update by starting the timer, and stopping the timer in response to determining that the apparatus is connected to the registration node via the second network access.

6. The apparatus of claim 1, the memory and the computer program code being configured, with the processor, to cause the apparatus to perform determining that the apparatus is connected to the registration node via the second network access, and in response to the determination triggering of the update by sending via the second network access a registration request to the registration node for updating the first registration.

7. The apparatus of claim 1, the memory and the computer program code being configured, with the processor, to cause the apparatus to perform the second registration by sending a registration request to the registration node, the registration request comprising a first request for the second registration and a second request for an update of the first registration using the second network access, and to perform triggering of the update in response to receiving a confirmation of the second request.

8. The apparatus of claim 7, wherein the second request comprises a flag, wherein the confirmation of the second request comprises the flag being set to a predefined value.

9. The apparatus of claim 1, wherein the first network access and the second network access are 3GPP access and non-3GPP access, respectively.

10. A method, comprising:
    performing, by a user equipment, a first registration with a registration node via a first network access;
    performing, by the user equipment, a second registration with the registration node via a second network access;

determining that the user equipment is not connected to the registration node via the first network access; and in response to the determination and dependent upon a connection status of the user equipment to the registration node via the second network access, triggering of an update of the first registration via the second network access.

11. The method of claim 10, wherein the first registration is performed before the second registration, after the second registration or concurrently with the second registration.

12. A computer program embodied on a non-transitory computer-readable medium, said computer program comprising instructions which, when executed in hardware, cause the hardware to perform at least:

a first registration of a user equipment with a registration node via a first network access;

a second registration of the user equipment with the registration node via a second network access;

determining that the user equipment is not connected to the registration node via the first network access; and in response to the determination and dependent upon a connection status of the user equipment to the registration node via the second network access, triggering of an update of the first registration via the second network access.

13. A method, comprising:

performing, by a registration node, a first registration of a user equipment via a first network access, upon receiving a first registration request from the user equipment;

performing, by the registration node, a second registration of the user equipment via a second network access, upon receiving a second registration request from the user equipment;

updating, by the registration node, the first registration dependent upon a connection status of the user equipment via the second network access.

14. A computer program embodied on a non-transitory computer-readable medium, said computer program comprising instructions which, when executed in hardware, cause the hardware to perform at least:

a first registration of a user equipment via a first network access, upon receiving a first registration request from the user equipment;

a second registration of the user equipment via a second network access, upon receiving a second registration request from the user equipment; and updating the first registration dependent upon a connection status of the user equipment via the second network access.

15. An apparatus, comprising:

at least one processor; and at least one memory including computer program code, the at least one memory and the computer program code being configured, with the at least one processor, to cause the apparatus to perform:

a first registration of a user equipment via a first network access, upon receiving a first registration request from the user equipment;

a second registration of the user equipment via a second network access, upon receiving a second registration request from the user equipment; and updating the first registration dependent upon a connection status of the user equipment via the second network access.

16. The apparatus of claim 15, wherein the memory and the computer program code are further configured, with the processor, to cause the apparatus to perform the updating by receiving a registration request from the user equipment via the second network access.

* * * * *